US010569446B2

(12) United States Patent
Kaneider et al.

(10) Patent No.: US 10,569,446 B2
(45) Date of Patent: *Feb. 25, 2020

(54) METHOD FOR CONTROLLING A WALL SAW SYSTEM WHEN MAKING A SEPARATING CUT

(71) Applicant: Hilti Aktiengesellschaft, Schaan (LI)

(72) Inventors: Wilfried Kaneider, Rankweil (AT); Dragan Stevic, Feldkirch-Tosters (AT); Christian Bereuter, Lingenau (AT)

(73) Assignee: Hilti Aktiengesellschaft, Schaan (LI)

( * ) Notice: Subject to any disclaimer, the term of this patent is extended or adjusted under 35 U.S.C. 154(b) by 310 days.

This patent is subject to a terminal disclaimer.

(21) Appl. No.: 15/509,449

(22) PCT Filed: Sep. 2, 2015

(86) PCT No.: PCT/EP2015/070043
§ 371 (c)(1),
(2) Date: Mar. 7, 2017

(87) PCT Pub. No.: WO2016/037915
PCT Pub. Date: Mar. 17, 2016

(65) Prior Publication Data
US 2017/0274558 A1      Sep. 28, 2017

(30) Foreign Application Priority Data

Sep. 8, 2014   (EP) .................................... 14003104

(51) Int. Cl.
*B28D 1/04*     (2006.01)
*B28D 7/00*     (2006.01)
(Continued)

(52) U.S. Cl.
CPC ........... *B28D 1/045* (2013.01); *B23D 59/002* (2013.01); *B28D 1/042* (2013.01); *B28D 7/005* (2013.01);
(Continued)

(58) Field of Classification Search
None
See application file for complete search history.

(56) References Cited

U.S. PATENT DOCUMENTS 4,572,580 A * 2/1986 Bieri ................... E01C 23/0933
299/1.5
5,237,897 A * 8/1993 Wijesinghe ............ B23D 55/10
83/72
(Continued)

FOREIGN PATENT DOCUMENTS

DE     10 2005 000 013 A1     8/2006
DE     10 2013 202 445 A1     8/2014
(Continued)

OTHER PUBLICATIONS

PCT/EP2015/070043, International Search Report dated Nov. 10, 2015, with partial English translation (Five (5) pages).
(Continued)

*Primary Examiner* — Brian W Wathen
*Assistant Examiner* — Kelvin Booker
(74) *Attorney, Agent, or Firm* — Crowell & Moring LLP (57) ABSTRACT

A method for controlling a wall saw system during creation of a separation cut in a workpiece between a first and second end point, is disclosed. The separation cut is carried out in a plurality of main cuts. In addition to the main-cut sequence, an overcut sequence having at least two overcuts is defined for each end point defined as a free end point. For each overcut sequence, a starting position and an end position are defined, the overcuts being carried out therebe- (Continued)

tween. The wall saw is positioned in the starting position and is pivoted into a first overcut angle; subsequently, the saw head is moved by way of the inclined saw arm until the end position has been reached. The wall saw is displaced back into the starting position and pivoted into a second overcut angle. This sequence is repeated until all of the overcuts have been carried out.

9 Claims, 9 Drawing Sheets

(51) Int. Cl.
  *G05B 19/40* (2006.01)
  *B23D 59/00* (2006.01)
  *G05B 19/402* (2006.01)
(52) U.S. Cl.
  CPC .. *G05B 19/402* (2013.01); *G05B 2219/45144* (2013.01)

(56) References Cited

U.S. PATENT DOCUMENTS

| | | | | |
|---|---|---|---|---|
| 6,131,557 | A * | 10/2000 | Watson | B23D 59/001 125/13.01 |
| 7,331,267 | B2 * | 2/2008 | Urmson | B23D 45/024 198/788 |
| 2006/0189258 | A1 * | 8/2006 | Schaer | B23D 59/002 451/5 |
| 2006/0201492 | A1 * | 9/2006 | Baratta | B23D 47/02 125/21 |
| 2007/0163412 | A1 * | 7/2007 | Baratta | B23D 47/02 83/651 |
| 2013/0174707 | A1 * | 7/2013 | Jonsson | B27G 19/02 83/478 |
| 2013/0180371 | A1 * | 7/2013 | Flock | B28D 1/044 83/13 |
| 2014/0028077 | A1 * | 1/2014 | Perkins, Jr. | E01C 23/0933 299/10 |
| 2015/0370241 | A1 * | 12/2015 | Brugger | B23D 59/002 700/170 |
| 2015/0375318 | A1 * | 12/2015 | Brugger | G05B 19/19 700/192 |
| 2016/0031022 | A1 * | 2/2016 | Brugger | B23D 59/002 83/13 |
| 2017/0252946 | A1 * | 9/2017 | Kaneider | B25F 5/00 |
| 2017/0255179 | A1 * | 9/2017 | Kaneider | G05B 9/02 |
| 2017/0274557 | A1 * | 9/2017 | Kaneider | B28D 1/042 |
| 2017/0274558 | A1 * | 9/2017 | Kaneider | B28D 1/042 |
| 2017/0282405 | A1 * | 10/2017 | Kaneider | B28D 1/042 |
| 2017/0282406 | A1 * | 10/2017 | Kaneider | B28D 1/042 |
| 2017/0291324 | A1 * | 10/2017 | Kaneider | B28D 1/042 |
| 2017/0297225 | A1 * | 10/2017 | Kaneider | B28D 1/042 |
| 2017/0345289 | A1 * | 11/2017 | Brugger | B23Q 1/0045 |
| 2018/0104849 | A1 * | 4/2018 | Dickson | B28D 1/003 |
| 2018/0104851 | A1 * | 4/2018 | Rieger | B28D 1/044 |
| 2018/0169898 | A1 * | 6/2018 | Kaneider | B28D 1/042 |
| 2019/0047178 | A1 * | 2/2019 | Kaneider | B25F 5/00 |

FOREIGN PATENT DOCUMENTS

| | | |
|---|---|---|
| EP | 1 693 173 B1 | 8/2006 |
| JP | 2006-231920 A | 9/2006 |
| JP | 2016-507390 A | 3/2016 |
| JP | 2016-507391 A | 3/2016 |
| JP | 2016-507392 A | 3/2016 |
| WO | WO 2014/124912 A1 | 8/2014 |
| WO | WO 2014/124931 A1 | 8/2014 |
| WO | WO 2014/128095 A1 | 8/2014 |

OTHER PUBLICATIONS

European Search Report issued in European counterpart application No. 14003104.8-1709 dated Apr. 28, 2015, with Statement of Relevancy (Seven (7) pages).
U.S. Patent Application, "Method for Controlling a Wall Saw System When Making a Separating Cut", filed Mar. 7, 2017, Inventor Wilfried Kaneider et al.
U.S. Patent Application, "Method for Controlling a Wall Saw System During the Creation of a Separation Cut", filed Mar. 7, 2017, Inventor Wilfried Kaneider et al.
U.S. Patent Application, "Method for Controlling a Wall Saw System During the Creation of a Separating Cut", filed Mar. 7, 2017, Inventor Wilfried Kaneider et al.
Japanese Notice of Reasons for Refusal issued in Japanese counterpart application No. 2017-513094 dated Mar. 28, 2018, with partial English translation (Seven (7) pages).
A Guide for a Scheme of Execution "A Wall Sawing Method", Japan, General Corporate Judicial Person Japan Concrete Sawing & Drilling Association, Jul. 1, 2011, $12^{th}$ Edition (28 total pages).

* cited by examiner

METHOD FOR CONTROLLING A WALL SAW SYSTEM WHEN MAKING A SEPARATING CUT

This application claims the priority of International Application No. PCT/EP2015/070043 filed Sep. 2, 2015, and European Patent Document No. 14003104.8, filed Sep. 8, 2014, the disclosures of which are expressly incorporated by reference herein.

The present invention relates to a method for controlling a wall saw system when making a separating cut.

A method is known from EP 1 693 173 B1 for controlling a wall saw system when making a separating cut in a workpiece between a first end point and a second end point. The wall saw system comprises a guide track and a wall saw with a saw head, a motorized feed unit that displaces the saw head parallel to a feed direction along the guide track, and at least one saw blade that is attached to a saw arm of the saw head and is driven about a rotation axis by a drive motor. The saw arm is pivotally designed by means of a pivot motor and a pivot axis. By means of a pivot motion of the saw about the swivel axis, the penetration depth of the saw blade into the workpiece is changed. The motorized feed unit comprises a guide carriage and a feed motor, wherein the saw is attached to the guide carriage and is displaced via the feed motor along the guide track. To monitor the wall saw system, there is provided a sensor device with a pivot angle sensor and a displacement sensor. The pivot angle sensor measures the current pivot angle of the saw arm and the displacement sensor measures the current position of the saw head on the guide track. The measured values for the current pivot angle of the saw arm and the current position of the saw head are transmitted on a regular basis to a control unit of the wall saw.

The known method for controlling a wall saw system is subdivided into a preparatory part and a control unit-controlled processing of the separating cut. In the preparatory part, the user determines at least the saw blade diameter of the saw blade, the positions of the first and second end points in the feed direction, and the end depth of the separating cut; additional parameters may be the material of the workpiece to be worked on and the dimensions of the embedded rebar. From the input parameters, the control unit determines for the separating cut a suitable main cutting sequence of main cuts, wherein the main cutting sequence comprises at least a first main cut having a first main cutting angle of the saw arm and a first diameter of the utilized saw blade, as well as a subsequent second main cut having a second main cutting angle of the saw arm and a first diameter of the utilized saw blade.

The known method for controlling a wall saw system has the disadvantage that none of the details regarding overcut processing of a free end point using overcutting are disclosed.

The object of the present invention consists of developing a method for controlling a wall saw system, in which the overcut processing of a free end point is performed controlled by the control unit of the wall saw.

In the method for controlling a wall saw system referred to in the beginning, this task is achieved according to the invention by the features of the independent claim. Advantageous developments are indicated in the dependent claims.

According to the invention, it is provided that prior to starting the cutting controlled by the control unit, there is established, in addition to the main cut sequence, for at least one free end point with overcutting, an overcutting sequence with overcutting, wherein the overcutting sequence comprises at least a first overcut with a first overcutting angle of the saw arm and a first diameter of the utilized sawblade as well as a second overcut with a second overcutting angle of the saw arm and a second diameter of the utilized saw blade. Because the overcut processing has its own overcutting sequence defined for it, the processing parameters can be adjusted to the overcut processing.

Preferably, the overcutting sequence comprises a number of n overcuts with j overcutting angles of the saw arm and j diameters of the utilized saw blade, j=1 to n. The number of overcuts that are necessary depends, among other things, on the specification of the saw blade, the material properties of the workpiece, as well as the power and torque of the drive motor for the saw blade. The overcutting angles can be established by the operator or the overcutting angles can be established by the control unit of the wall saw system as a function of various boundary conditions. For the method according to the invention, the overcutting angles represent an input variable that is used for controlling the wall saw.

Preferably, prior to starting the control unit-controlled processing, a saw arm length of the saw arm, which is defined as the distance between the pivot axis of the saw arm and the rotation axis of the saw blade, and a distance between the pivot axis and the top side of the workpiece are defined. For the controlled processing of a separating cut, various parameters must be known to the control unit. These include the saw arm length that represents a fixed, device-specific dimension of the wall saw, and the perpendicular distance between the pivot axis and the surface of the workpiece that depends, besides the geometry of the wall saw, also on the geometry of the guide track used.

In a first embodiment, the first end point of the separating cut is defined as a free end point with overcutting. For the overcutting sequence, the control unit calculates a first end position, wherein the pivot axis in the first end position has a position coordinate of $X(E_1)+\sqrt{[\Delta h(D_m-\Delta h)]}-\delta \sin(\pm\alpha_m)$, wherein $\Delta h=(h_m-T)$ refers to the difference between the penetration depth for the last main cutting angle and the end depth, and $h_m=h(\pm\alpha_{m1}, D_m)=D_m/2-\Delta\delta\cdot\cos(\pm\alpha_m)$ refers to the penetration depth of the utilized saw blade into the workpiece for the last main cutting angle. When the pivot axis has reached the first end position, the material at the first end point is completely removed and the separating cut in the region of the free first end point is completed.

In a further development of the first embodiment, in the $j^{th}$ overcut of the overcutting sequence, j=1 to n, the saw head is positioned in a first starting position, the saw arm is pivoted into the first starting position in the $j^{th}$ overcutting angle, and the saw head with the saw arm tilted in the $j^{th}$ overcutting angle is moved into the first end position.

In a particularly preferred manner, the pivot axis in the first starting position has a position coordinate of $X(E_1)+\sqrt{[h(\pm\varphi_{1,n})\cdot(D_{1,n}-h(\pm\varphi 1,n))]}-\delta\cdot\sin(\pm\varphi_{1,n})$ for $0°<\varphi_{1,n}\leq 90°$ and $X(E_1)+\sqrt{[h(\pm\varphi_{1,n})(D_{1,n}-h(\pm\varphi_{1,n}))]}-\delta\cdot\sin(\pm 90°)$ for $90°<\varphi_{1,n}\leq 180°$, wherein $h(\pm\varphi_{1,n}, D_{1,n})=D_{1,n}/2-\Delta-\delta\cdot\cos(\pm\varphi_{1,n})$ refers to the penetration depth of the utilized saw blade into the workpiece for the $n^{th}$ overcutting angle $(\pm\varphi_{1,n})$. The first starting position ensures that the pivot motion in all overcutting angles of the overcutting sequence occurs prior to the first end point and that the first end point is exceeded.

In a second embodiment, the second end point is defined as a free end point with overcutting. For the overcutting sequence, the control unit calculates a second end position, wherein the pivot axis, in the second position, has position coordinate of $X(E_2)-\sqrt{[\Delta h\cdot(D_m-\Delta h)]}+\delta\cdot\sin(\pm\alpha_m)$, wherein $\Delta h=(h_m-T)$ refers to the difference between the penetration depth $h_m$ for the last main cut angle and the end depth T, and $h_m=h(\pm\alpha_m, D_m)=D_m/2-\Delta-\delta\cdot\cos(\pm\alpha_m)$ refer to the penetration depth of the saw blade into the workpiece for the last main cutting angle. When the pivot axis has reached the second end position, the material at the second end point is completely removed and the separating cut in the region of the free second end point is completed.

In a further development of the second embodiment, in the $j^{th}$ overcut of the overcutting sequence, j=1 to n, the saw head is positioned in a second starting position, the saw arm in the second starting position is pivoted in the $j^{th}$ overcutting angle, and the saw head with the saw arm tilted in the $j^{th}$ overcutting angle is moved into the second end position.

In a particularly preferred manner, the pivot axis has in the second starting position a position coordinate of $X(E_2)-\sqrt{[h(\pm\varphi_{2,n})\cdot(D_{2,n}-h(\pm\varphi_{2,n}))]}\cdot\sin(\pm\varphi_{2,n})$ for $0°<\varphi_{2,n}\leq 90°$ and $X(E_2)-\sqrt{[h(\pm\delta_{2,n})(D_{2n}-h(\pm\varphi_{2,n}))]}-\delta\cdot\sin(\pm 90°)$ for $90°<\varphi_{2n}\leq 180°$, wherein $h(\pm\varphi_{2,n}, D_{2,n})=D_{2n}2-\Delta-\delta\cdot\cos(\pm\varphi_{2,n})$ refers to the penetration depth of the utilized saw blade into the workpiece for the $n^{th}$ overcutting angle $(\pm\varphi_{2,n})$. The second starting position ensures that the pivot motion in all overcutting angles of the overcutting sequence occurs prior to the second end point and that the second end point is not exceeded.

Embodiments of the invention are described hereafter by means of drawings. These are not necessarily meant to depict the embodiments true to scale; rather, the drawings, where useful for explanation purposes, is executed in a schematic and/or slightly distorted form. In regard to supplements of the teachings directly evident from the drawings, one shall refer to the relevant prior art. In doing so, one shall take into account that diverse modifications and changes pertaining to the form and detail of an embodiment may be undertaken without deviating from the general idea of the invention. The features of the invention disclosed in the description, drawings, and claims may be significant individually as well as in any combination for developing the invention. In addition, falling within the scope of the invention are all combinations of at least two features disclosed in the description, drawings, and/or claims. The general idea of the invention is not restricted to the exact form or detail of the preferred embodiments shown and described below or limited to a subject matter that would be restricted in comparison to the subject matter claimed in the claims. For given dimensional ranges, values lying within the mentioned limits shall be disclosed as limits and they can be implemented and claimed as desired. For simplicity's sake, the same reference signs are used below for identical or similar parts or parts with identical or similar functions.

DETAILED DESCRIPTION OF THE DRAWINGS

Figure 1:
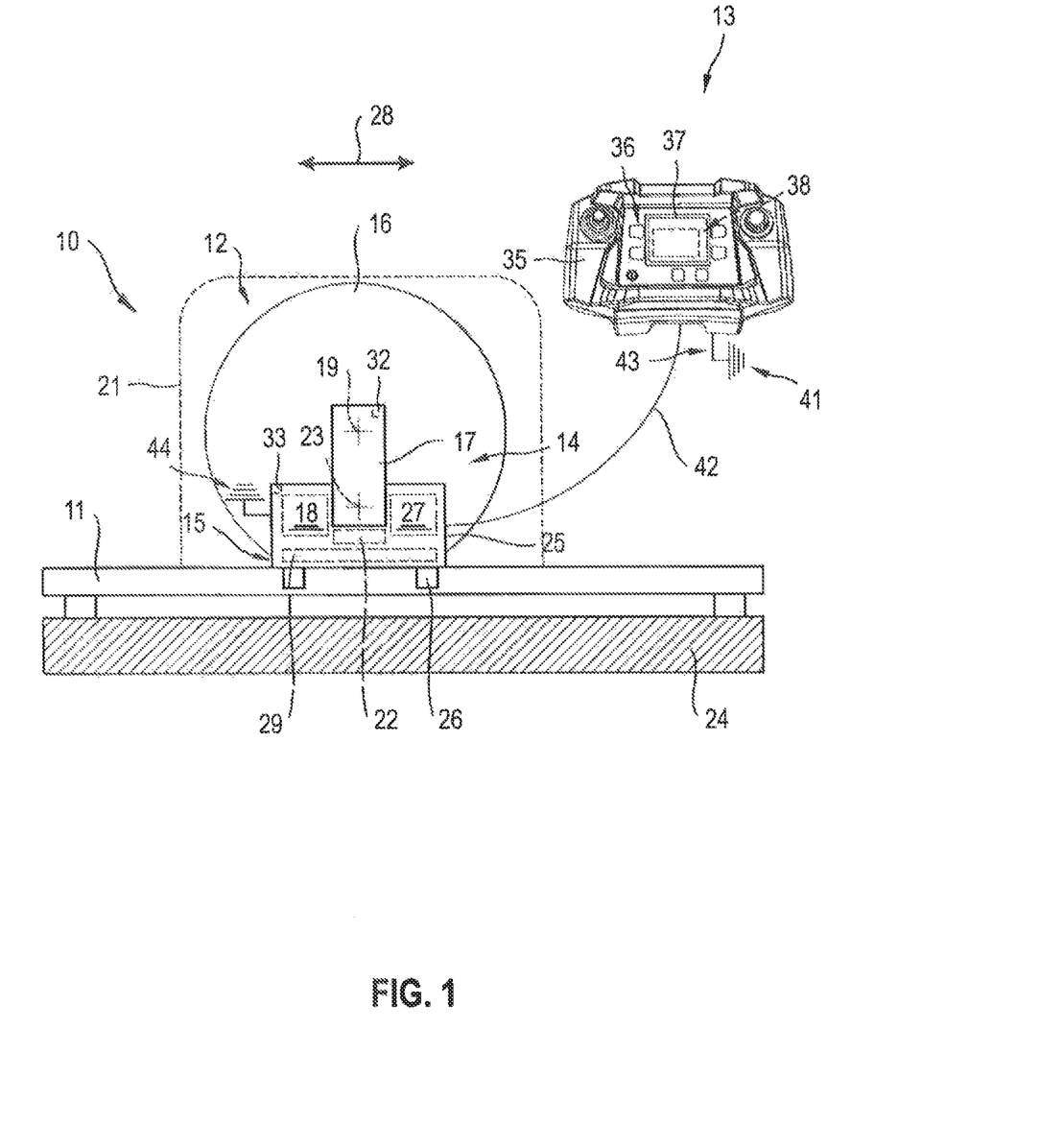
FIG. 1 illustrates a wall saw system with a guide track and a wall saw.

FIG. 1 depicts a wall saw system 10 with a guide track 11, a tool device 12 displaceably arranged on guide track 11, and a remote control unit 13. The tool device is designed as a wall saw 12 and comprises a cutting unit 14 and a motorized feed unit 15. The cutting unit is designed as a saw head 14 and comprises a cutting tool 16 designed as a saw blade, which is attached to a saw arm 17 and is driven by a drive motor 18 about a rotation axis 19.

To protect the operator, saw blade 16 is enclosed by a blade guard 21, which is attached to saw arm 17. Saw arm 17 is designed to be pivotable by a pivot motor 22 about a pivot axis 23. Pivot angle $\alpha$ of saw arm 17 along with a saw blade diameter D of saw blade 16 determines how deep saw blade 16 penetrates into a workpiece 24 to be cut. Drive motor 18 and pivot motor 22 are arranged in a device housing 25. Motorized feed unit 15 comprises a guide carriage 26 and a feed motor 27, which in the embodiment is also arranged in device housing 25. Saw head 14 is attached on guide carriage 26 and is designed to be displaceable via feed motor 27 along guide track 11 in a feed direction 28. Arranged in device housing 25 are, besides motors 19, 22, 27, a control unit 29 for controlling saw head 14 and motorized feed unit 15.

To monitor wall saw system 10 and the cutting process, a sensor device having multiple sensor elements is provided. A first sensor element 32 is designed as a pivot angle sensor and a second sensor element 33 is designed as a displacement sensor. Pivot angle sensor 32 measures the current pivot angle of saw arm 17 and displacement sensor 33 measures the current position of saw head 14 on guide track 11. The measurement variables are transmitted by pivot angle sensor 32 and displacement sensor 33 to control unit 29 and are used to control wall saw 12.

Remote control 13 comprises a device housing 35, an input device 36, a display device 37, and a control unit 38, which is arranged inside device housing 35. Control unit 38 converts the inputs of input device 36 into control commands and data, which are transmitted via a first communications link to wall saw 12. The first communications link is designed as a wire- and cable-less communications link 41 or as communications cable 42. The wire- and cable-less communications link is designed in the embodiment as radio link 41, which is formed between a first radio unit 43 on remote control unit 13 and a second radio unit 44 on tool device 12. Alternatively, the wire- and cable-less communications link 41 may be designed in the form of an infrared, Bluetooth, WLAN, or WiFi link.

Figure 2A:
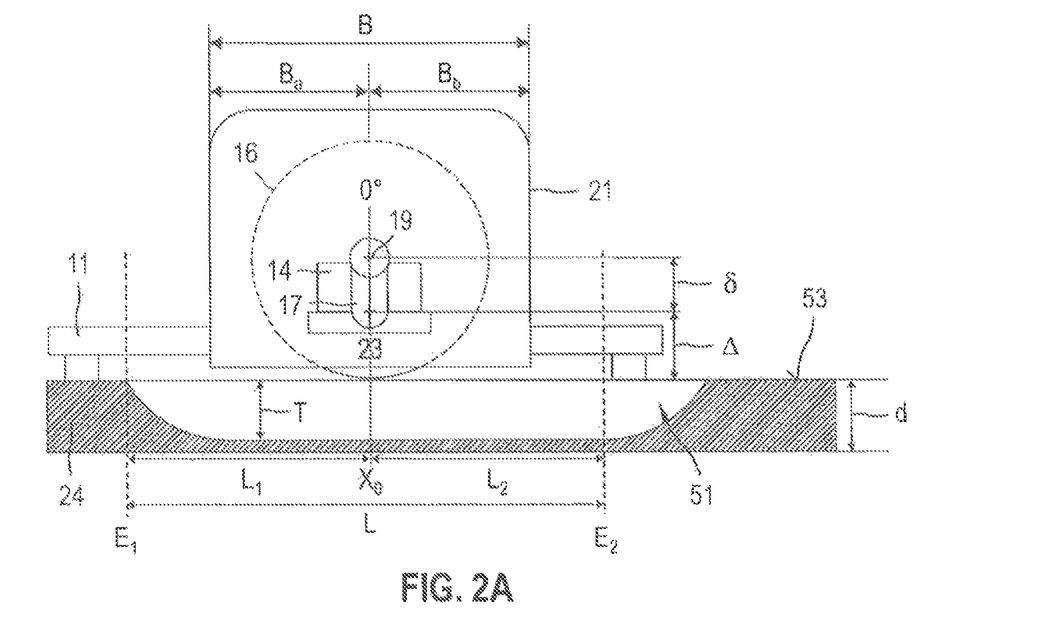
FIGS. 2A, B illustrate processing a separating cut between a first and second free end point without an obstacle.
Figure 2B:
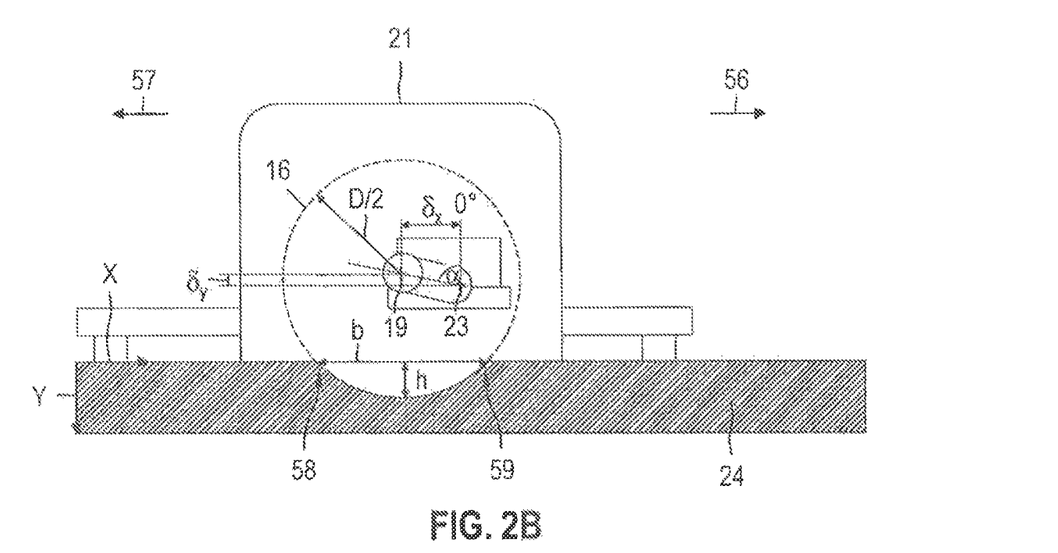

FIGS. 2A, B depict guide track 11 and wall saw 12 of wall system 10 of FIG. 1 when making a separating cut 51 in workpiece 24 having workpiece thickness d. Separating cut 51 has an end depth T and moves in feed direction 28 between a first end point $E_1$ and a second end point $E_2$. A direction parallel to feed direction 28 is defined as direction X, wherein positive direction X is oriented from first end point $E_1$ to second end point $E_2$, and a direction perpendicular to direction X into the depth of workpiece 24 is defined as direction Y.

The end point of a separating cut may be defined as a free end point without an obstacle or as an obstacle. Both end points can thereby be defined as free end points without obstacles, both end points as obstacles, or an end point as a free end point and the other end point as an obstacle. An overcut may be permitted at a free end point without an obstacle. By means of the overcut, the cutting depth at the end point reaches end depth T of the separating cut, in the embodiments of FIGS. 2A, B, end points $E_1$, $E_2$ form free end points without obstacles, wherein overcutting is not permitted at the free first end point end point $E_1$, and overcutting does occur at second end point $E_2$.

FIG. 2A depicts saw head. 14 in an installation position $X_0$ and saw arm 17 in a basic position of 0°. Saw head 14 is positioned by the operator, by means of guide carriage 26, in installation position $X_0$ on guide track 11. Installation position $X_0$ of saw head 14 lies between first and second end points $E_1$, $E_2$ and is determined by the position of pivot axis 23 in feed direction 28. The position of pivot axis 23 is particularly suited as a reference position $X_{Ref}$ to monitor the position of saw head 14 and control wall saw 12, since the X-position of pivot axis 23 remains unchanged even during the pivot motion of saw arm 17. Alternatively, a different X-position can be established as a reference position on saw head 14, wherein the distance in direction X to pivot axis 23 must be known in this case.

In the embodiment, the X-positions of first and second end points $E_1$, $E_2$ are established by entering partial lengths. The distance between installation position $X_0$ and first end point $E_1$ are determined by a first partial length $L_1$ and the distance between installation position $X_0$ and second end point $E_2$ are determined by a second partial length $L_2$. Alternatively, the X-positions of end points $E_1$, $E_2$ may be established by entering a partial length ($L_1$ or $L_2$) and a total length L as a distance between end points $E_1$, $E_2$.

Separating cut 51 is made in multiple partial cuts until the desired end depth T is reached. The partial cuts between the first and second end points $E_1$, $E_2$ are defined as main cuts and the cutting sequence of the main cuts is defined as the main cutting sequence. At the end points of the separating cut, one can perform additional corner-cutting that is referred to as obstacle cutting for an obstacle, and overcut cutting for a free end point with overcutting.

The main cutting sequence can be established by the operator or the main cutting sequence can be established by the control unit of the wall saw system as a function of multiple boundary conditions. Conventionally, the first main cut, which is also referred to as a precut, is carried out with a reduced cutting depth and reduced power of the drive motor to prevent the saw blade from becoming polished. The additional main cuts are generally performed with the same cutting depth, but they may also have various cutting depths. The boundary conditions typically established by an operator include the cutting depth of the precut, the efficiency of the precut, and the maximum cutting depth of the additional main cuts. From these boundary conditions, the control unit can determine the main cutting sequence.

The main cuts of a separating cut are performed with one saw blade diameter or with two or more saw blade diameters. If multiple saw blades are used, the cutting generally begins with the smallest saw blade diameter. To be able to assemble saw blade 16 on saw arm 17, saw blade 16 must be arranged in the basic position of saw arm 17 above workpiece 24. Whether this boundary condition is met depends on two device-specific variables of wall saw system 10: on the one hand, a perpendicular distance Δ between pivot axis 23 of saw arm 17 and on the other, a top side 53 of workpiece 24 and a saw arm length δ of saw arm 17, which is defined as the distance between rotation axis 19 of saw blade 16 and pivot axis 23 of saw 17. When the sum of these two device-specific variables is greater than half the saw blade diameter D/2, saw blade 16 is arranged in the basic position above workpiece 24. Saw blade length δ is a fixed device-specific variable of wall saw 12, whereas perpendicular distance Δ between pivot axis 23 and surface 53 depends, besides on the geometry of wall saw 12, also on the geometry of utilized guide track 11.

Saw blade 16 is attached on a flange on saw arm 17 and is driven in sawing mode by drive motor 18 about rotation axis 19. In the basic position of saw arm 17, which is depicted in FIG. 2A, the pivot angle is 0° and rotation axis 19 of saw blade 16 lies in depth direction 52 above pivot axis 23. Saw blade 16 is moved out of the basic position at 0° into workpiece 24 by a pivot motion of saw arm 17 about pivot axis 23. During the pivot motion of saw arm 17, saw blade 16 is driven by drive motor 18 about rotation axis 19.

To protect the operator, saw blade 16 is to be enclosed by blade guard 21 when in operation. Wall saw 12 is operated with blade guard 21 or without blade guard 21. To make the separating cut in the region of end points $E_1$, $E_2$, removal of blade guard may be performed, such as blade guard 21, for example. If various saw blade diameters are used to make the separating cut, one generally also uses various blade guards with corresponding blade guard widths.

FIG. 2B depicts saw arm 17, which is tilted in a negative rotation direction 54 at a negative pivot angle –α. Saw arm 17 is adjustable in negative rotation direction 54 between pivot angles from 0° to –180° and in a positive rotation direction 55, oriented opposite negative rotation direction 54, between pivot angles 0° to +180°. The arrangement of saw arm 17 depicted in FIG. 2B is referred to as a "pulling configuration" when saw head 14 is moved in a positive feed direction 56. When saw head 14 moves in a negative feed direction 57, oriented opposite positive feed direction 56, the arrangement of saw arm 17 is referred to as a "pushing configuration."

Given a pivot angle of ±180°, the maximum penetration depth of saw blade 16 into workpiece 24 is reached. By means of the pivot motion of saw arm 17 about pivot axis 23, the position of rotation axis 19 is shifted in direction X and direction Y. The shift of rotation axis 19 is thereby dependent on saw arm length δ and pivot angle α of saw arm 17. The displacement distance $δ_x$ in direction X is equal to δ·sin(±α) and the displacement distance $δ_y$ in direction Y is equal to δ·cos(±α).

In workpiece 24, saw blade 16 produces a cutting wedge in the form of a circular segment having a height h and a width b. Height h of the circular segment corresponds to the penetration depth of saw blade 16 in workpiece 24. For penetration depth h, equation D/2=h+Δ+δ·cos(α) applies, wherein D is the saw blade diameter, h is the penetration depth of saw blade 16, Δ is the perpendicular distance between pivot axis 23 and top side 53 of workpiece 24, δ is the saw arm length, and α is the first pivot angle; for width b, the equation $b^2=D/2·8h-4h^2=4Dh-4h^2=4h·(D-h)$, wherein h is the penetration depth of saw blade 16 in workpiece 24 and D is the saw blade diameter.

Controlling wall saw 12 during the separating cut depends on whether the end points are defined as obstacles, and for an obstacle, whether cutting occurs with blade guard 21 or without blade guard 21. For a free end point without an obstacle, controlling wall saw 12 in the method according to the invention occurs by means of upper exit points of saw blade 16 on top side 53 of workpiece 24. The upper exit points of saw blade 16 can be calculated from reference position $X_{Ref}$ of pivot axis 23 in direction X, displacement path $δ_x$ of rotation axis 19 in direction X, and width b. An upper exit point facing first end point $E_1$ is referred to as first upper exit point 58 and an upper exit point facing second end point $E_2$ is referred to as second upper exit point 59. For first upper exit point 58, $X(58)=X_{Ref}+δ_x-b/2$ applies, and for second upper exit point 59, $X(59)=X_{Ref}+δ_x+b/2$ applies where b=√[h(D–h)] and h=h($α_1$D).

If end points $E_1$, $E_2$ are defined as obstacles, overrunning end points $E_1$, $E_2$ with wall saw 12 is not possible. In this case, wall saw 12 in the method according to the invention is controlled via reference position $X_{Ref}$ of pivot axis 23 and the boundary of wall saw 12. One thereby differentiates between processing without blade guard 21 and processing with blade guard 21.

Figure 3A:
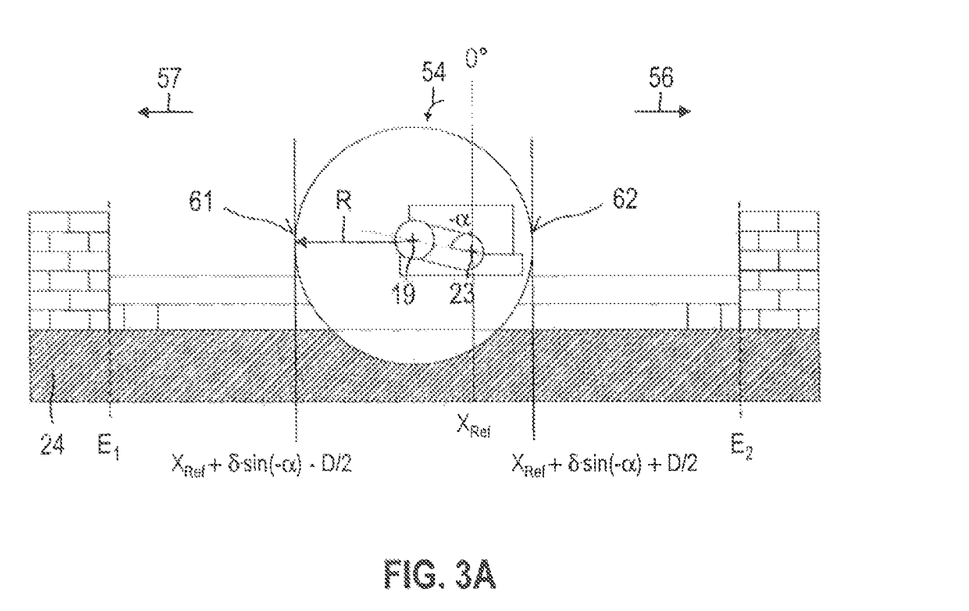
FIGS. 3A, B illustrate processing a separating cut between a first and second obstacle with a saw blade that is not enclosed by a blade guard.
Figure 3B:
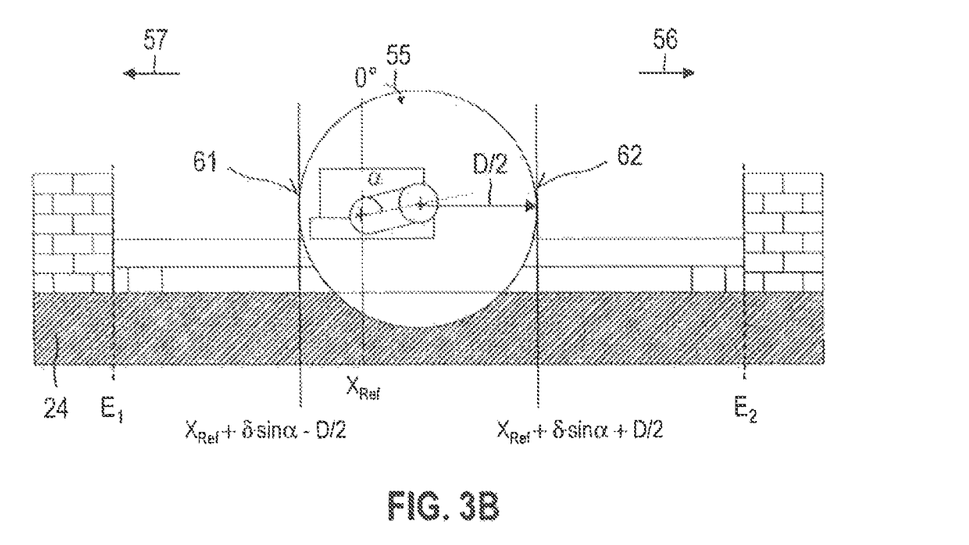

FIGS. 3A, B depict wall saw system 10 when making a separating cut between first end point $E_1$ and second end point $E_2$, which are defined as obstacles, wherein the cutting occurs without blade guard 21. When cutting without blade guard 21, a first saw blade edge 61, which faces first end point $E_1$, and a second saw blade edge 62, which faces second end point $E_2$, form the boundary of wall saw 12.

The X-positions of the first and second saw blade edge 61, 62 in direction X can be calculated from reference position $X_{Ref}$ of pivot axis 23, displacement distance $\delta_x$ of rotation axis 19 and saw blade diameter D. FIG. 3A depicts wall saw 12 with saw arm 17 tilted in negative rotation direction 54 at a negative pivot angle $-\alpha$ (0° to $-180°$). For first saw blade edge 61, $X(61)=X_{Ref}+\delta\cdot\sin(-\alpha)-D/2$ applies and for the second saw blade edge 62, $X(62)=X_{Ref}+\delta\cdot\sin(-\alpha)+D/2$ applies. FIG. 3B depicts wall saw 12 with saw arm 17 tilted in positive rotation direction 55 at a positive pivot angle $\alpha$ (0° to $+180°$). For first saw blade edge 61, $X(61)=X_{Ref}+\delta\cdot\sin(\alpha)-D/2$ applies and for the second saw blade edge 62, $X(62)=X_{Ref}+\delta\cdot\sin(\alpha)+D/2$ applies.

Figure 4A:
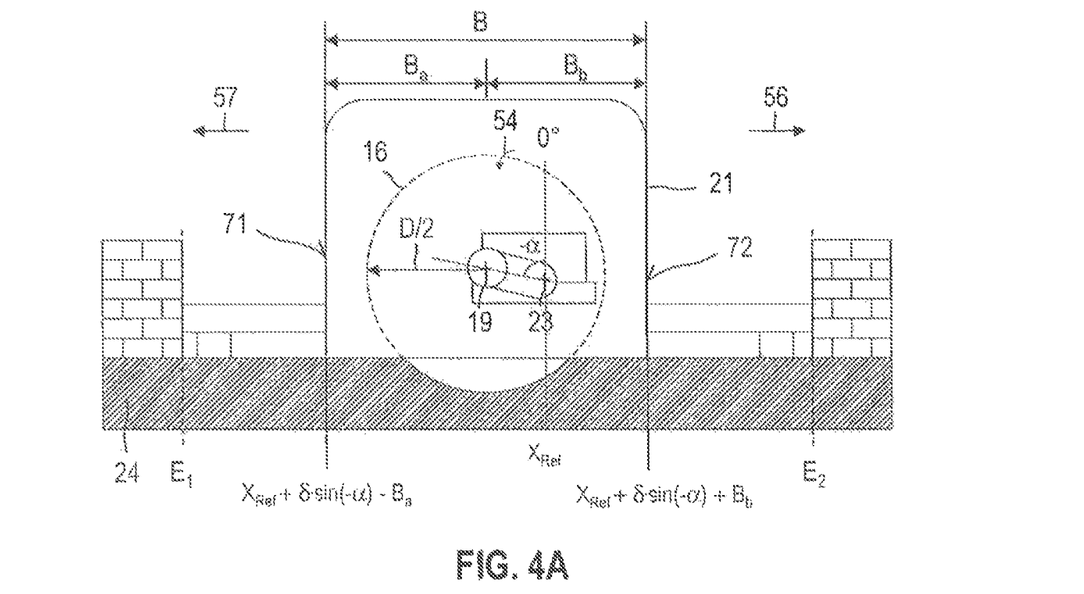
FIGS. 4A, B illustrate processing a separating cut between a first and second obstacle with a saw blade that is enclosed by a blade guard.
Figure 4B:
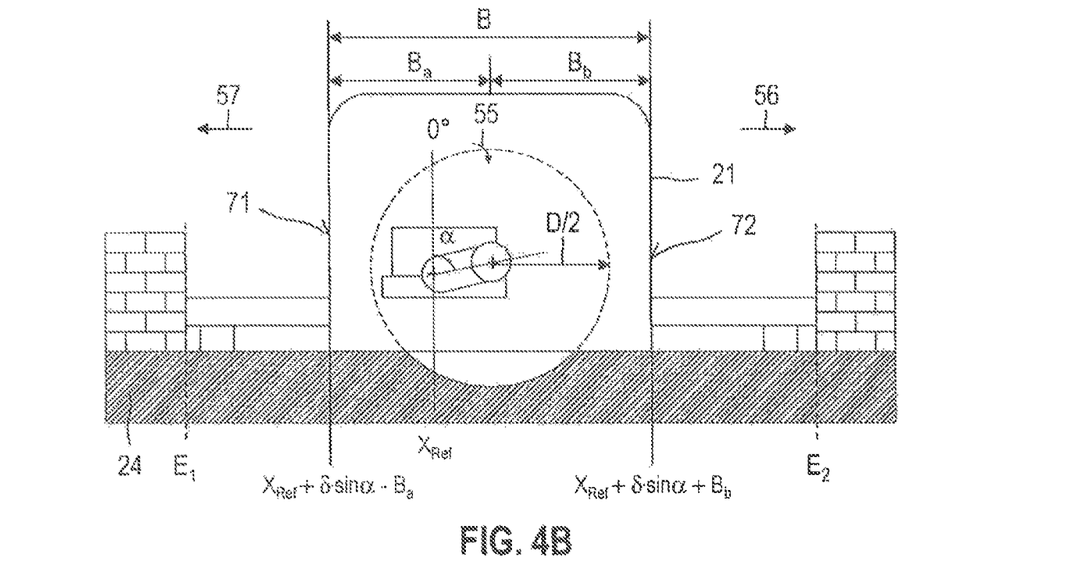

FIGS. 4A, B depict wall saw system 10 when making a separating cut between first end point $E_1$ and second end point $E_2$, which are defined as obstacles, wherein the cutting occurs with blade guard 21. When cutting without blade guard 21, the boundary of wall saw 12 is formed by a first blade guard edge 71, which faces first end point $E_1$, and a second blade guard edge 72, which faces second end point $E_2$.

The X-positions of the first and second blade guard edge 71, 72 in direction X can be calculated from reference position $X_{Ref}$ of pivot axis 23, displacement distance $\delta_x$ of rotation axis 19 and blade guard width B. FIG. 4A depicts wall saw 12 with saw arm 17 inclined at a negative pivot angle $-\alpha$ (0° to $-180°$) and installed blade guard 21 having blade guard width B. Given an asymmetrical blade guard and before the start of the controlled processing, the distances of rotation axis 19 to blade guard edges 71, 72 are determined, wherein the distance to first blade guard edge 71 is referred to as first distance $B_a$ and the distance to second blade guard edge 72 is referred to as second distance $B_b$.

For first blade guard edge 71, $X(71)=X_{Ref}+\delta\sin(\alpha)-B_a$ applies, and for the second blade guard edge 72, $X(72)=X_{Ref}+\delta\sin(\alpha)+B_b$ applies. FIG. 4B depicts wall saw 12 with saw head 17 tilted at a positive pivot angle $\alpha$ (0° to $+180°$) and installed blade guard 21 having blade guard width B. For first blade guard edge 71, $X(71)=X_{Ref}+\delta\sin(\alpha)-B_a$ applies, and for the second blade guard edge 72, $X(72)=X_{Ref}+\delta\sin(\alpha)+B_b$ applies.

FIGS. 2A, B depict a separating cut between two end points $E_1$, $E_2$ that are defined as free end points without obstacles, and FIGS. 3A, B and 4A, B depict a separating cut between two end points $E_1$, $E_2$ that are defined as obstacles. In actual practice, separating cuts are also possible in which one end point is defined as an obstacle and the other end point represents an end point without an obstacle, wherein the control of the wall saw for the free end point occurs via the upper exit point of the saw blade and for the obstacle via the saw blade edge (cutting without blade guard 21) or the blade guard edge (cutting with blade guard 21).

The first upper exit point 58, first saw blade edge 61 and first blade guard edge 71 are combined under the term "first boundary" of wall saw 12; and the second upper exit point 59, second saw blade edge 62 and second blade guard edge 72 are combined under the term "second boundary."

Figure 5A:
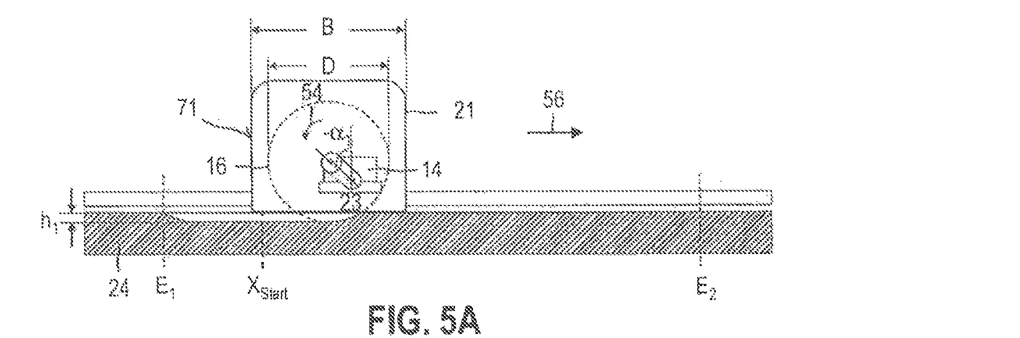
FIGS. 5A-T illustrate the wall saw system of FIG. 1 when making a separating cut between a first obstacle and a second free end point without an obstacle.
Figure 5B:
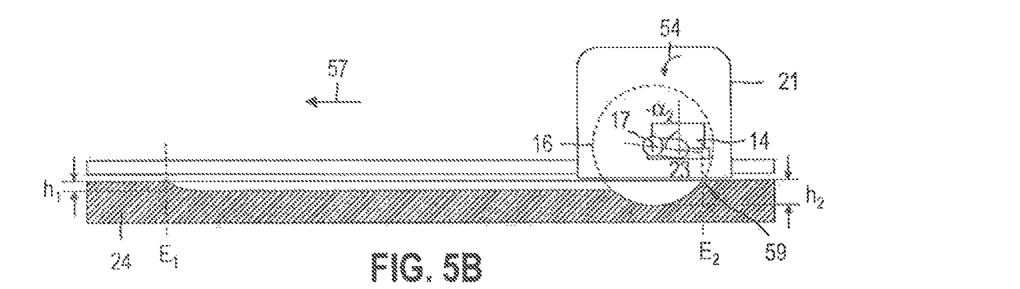
Figure 5C:
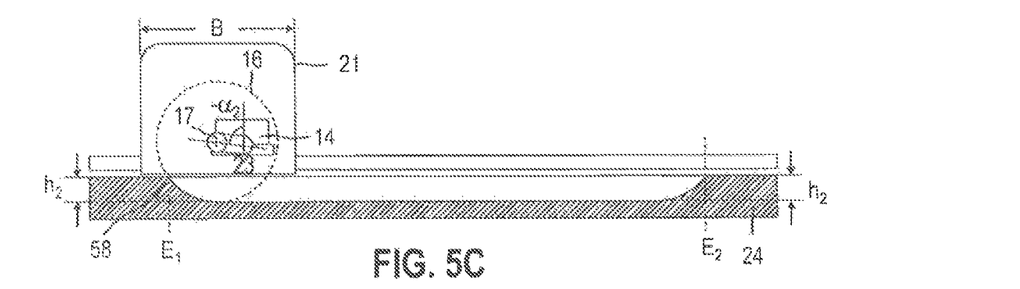
Figure 5D:
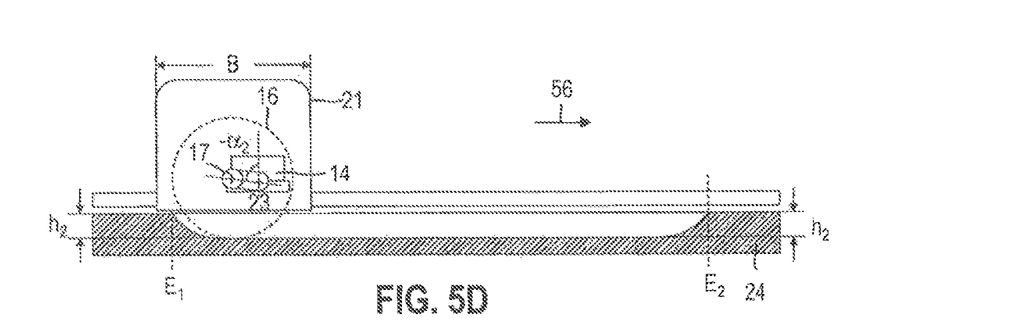
Figure 5E:
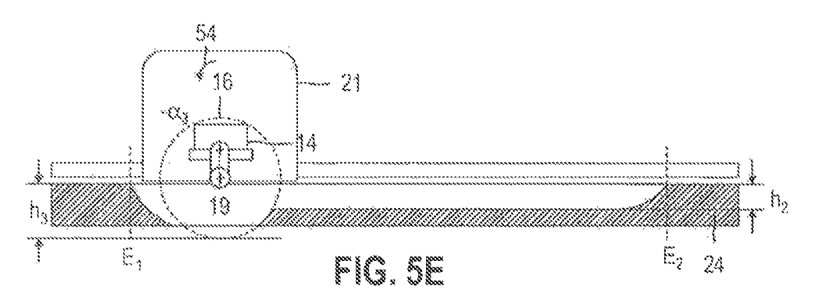
Figure 5F:
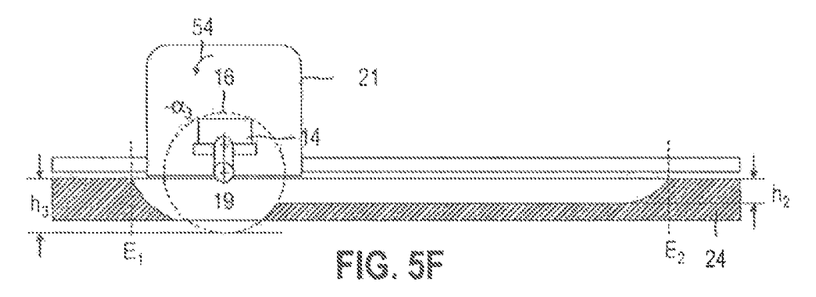
Figure 5G:
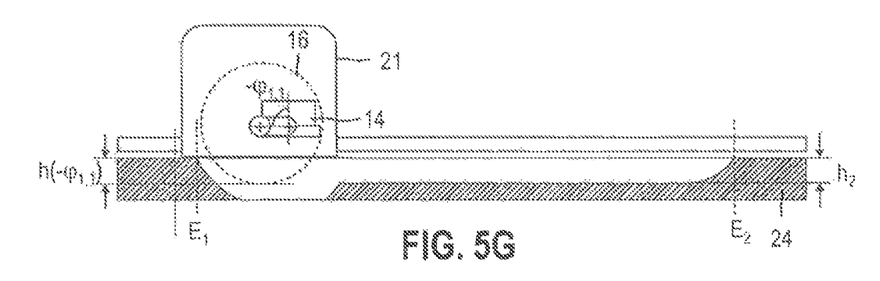
Figure 5H:
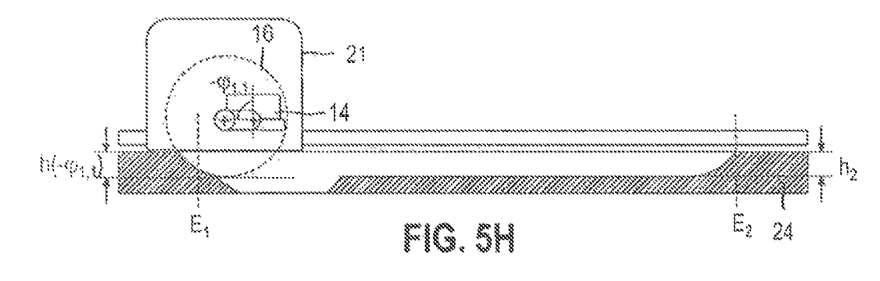
Figure 5I:
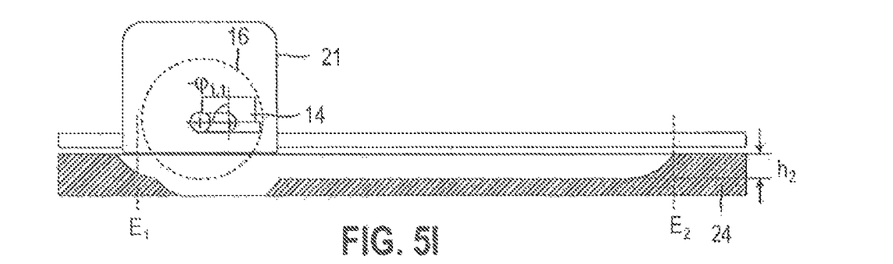
Figure 5J:
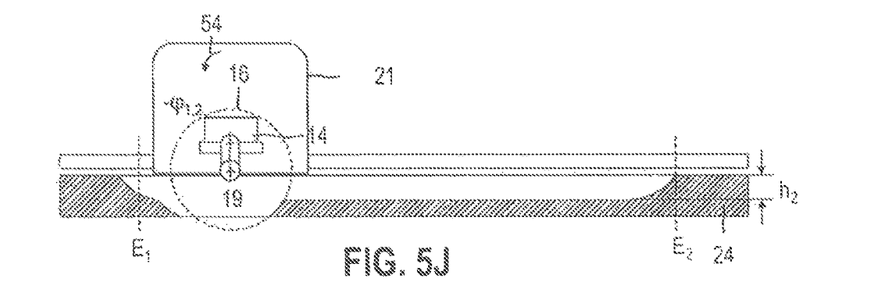
Figure 5K:
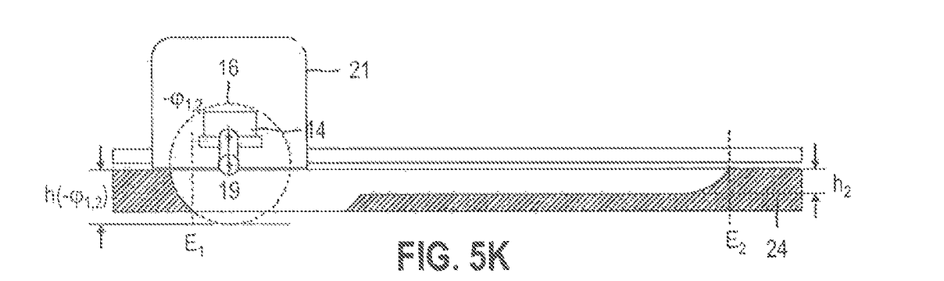
Figure 5L:
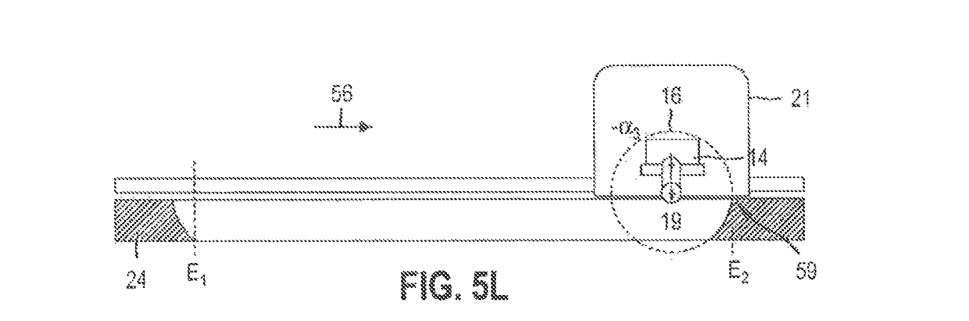
Figure 5M:
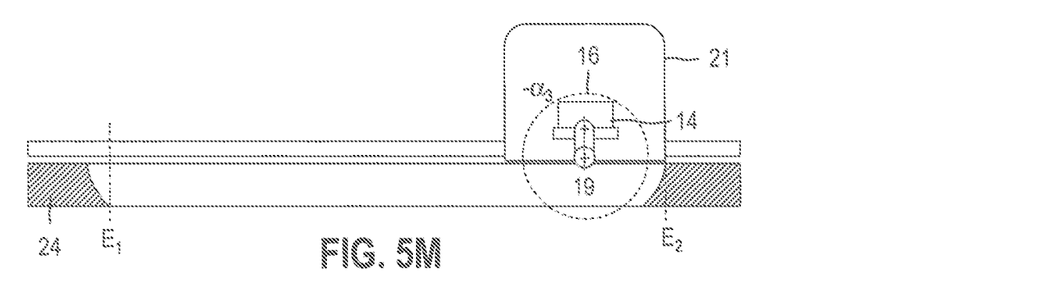
Figure 5N:
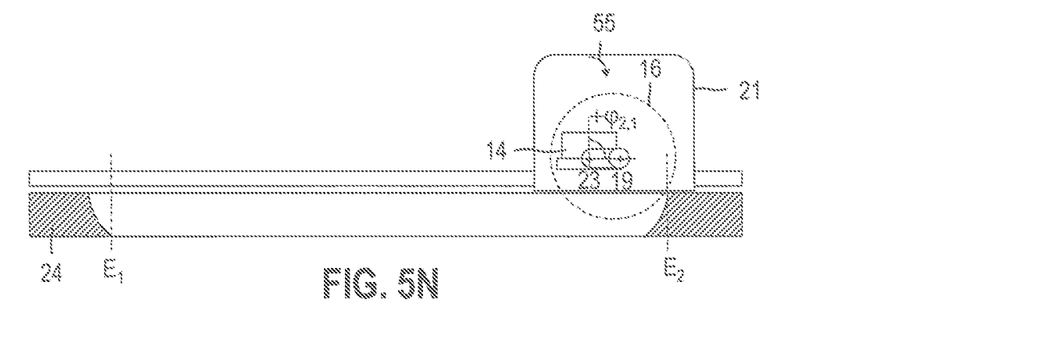
Figure 5O:
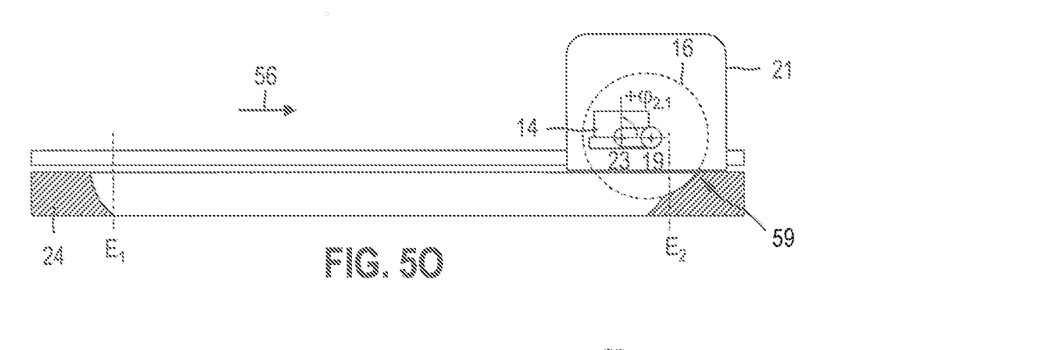
Figure 5P:
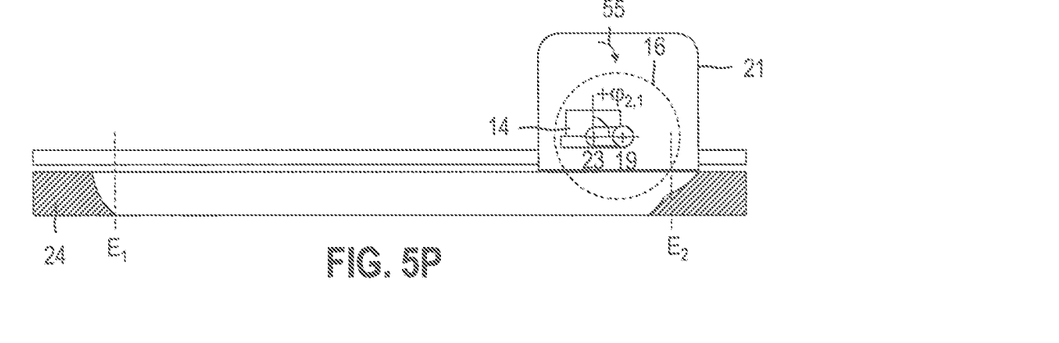
Figure 5Q:
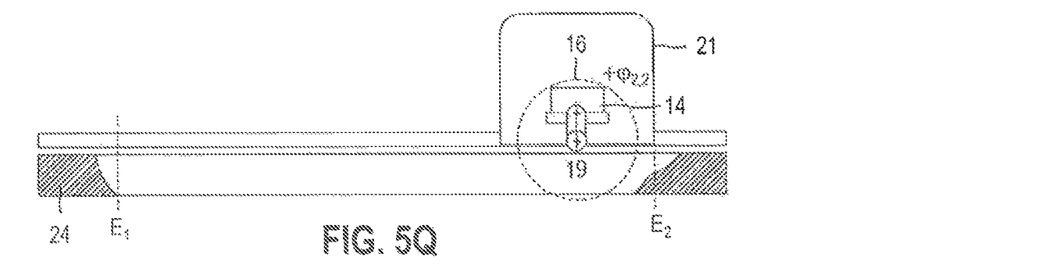
Figure 5R:
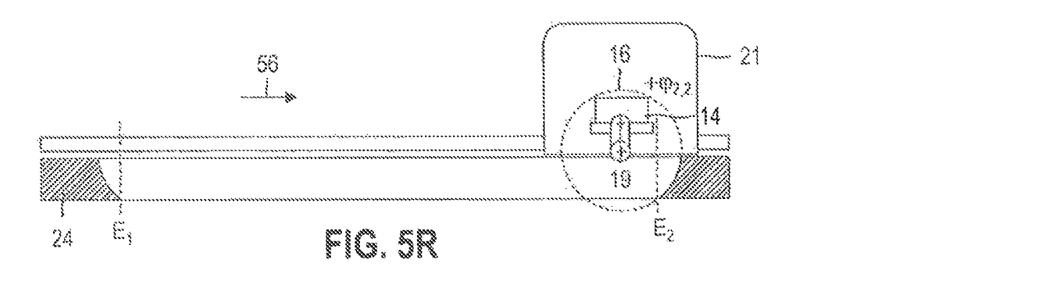
Figure 5S:
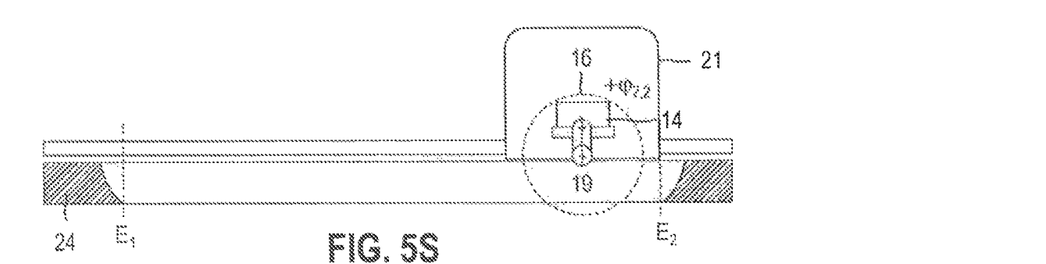
Figure 5T:
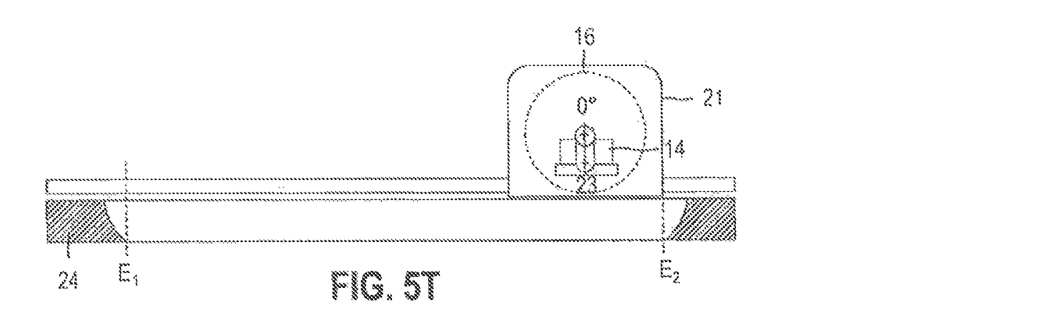

FIGS. 5A-T depict wall saw system 10 of FIG. 1 with guide track 11 and wall saw 12 when making a separating cut having end depth T in workpiece 24 between first end point $E_1$, which is defined as a free end point with overcutting, and a second end point $E_2$, which is defined as a free end point with overcutting.

Performing the separating cut occurs using the method according to the invention for controlling a wall saw system. The separating cut comprises a main cutting sequence of multiple main cuts, which are made between the first end point $E_1$ and the second end point $E_2$, a first overcutting sequence for free first end point $E_1$ with overcutting, and a second overcutting sequence for free second end point $E_2$ with overcutting.

The main cutting sequence comprises a first main cut having a first main cutting angle $\alpha_1$ of saw arm 17, a first diameter $D_1$, and a first penetration depth $h_1$ of the utilized saw blade; a second main cut having a second main cutting angle $\alpha_2$ of saw arm 17, a second diameter $D_2$, and a second penetration depth $h_2$ of the utilized saw blade; as well as third main cut having a third main cutting angle $\alpha_3$ of saw arm 17, a third diameter $D_3$, and a third penetration depth $h_3$ of the utilized saw blade.

In the embodiment, the first, second, and third main cuts are performed by saw blade 16 and the associated blade guard 21. Therefore, the diameters of main cuts $D_1$, $D_2$, $D_3$ correspond to saw blade diameter D of saw blade 16. Alternatively, the main cuts may be performed with various saw blade diameters. When cutting with multiple saw blades, the method according to the invention comprises a method stage for changing the saw blade to another saw blade diameter.

For processing the main cuts, three method variants are suitable that differ from each other in regard to the processing quality of the separating cut and the required processing time. Depending on the requirements of the separating cut, the operator determines prior to starting the controlled cutting which method variant is used for the main cutting sequence. In the first method variant, the main cuts are performed with a saw arm 17 in a pulling configuration. The pulling configuration of saw arm 17 allows for a stable guiding of saw blade 16 while cutting and a narrow cut gap. In the second and third method variants, saw arm 17 is configured alternatingly in a pulling and pushing manner, wherein the first main cut is performed in a pulling configuration. A separating cut, in which saw arm 17 is alternatingly configured in a pulling and pushing manner, has the advantage that the non-productive times required to position saw head 14 and pivot around saw arm 17 are reduced compared to the pulling configuration.

In every main cut of the first method variant, following each other in sequence are the positioning of saw head 14; a pivot motion of saw arm 17 in the main cutting angle; a cutting in a first feed direction; a stopping of saw head 14; a pivoting around of saw arm 17 in the negative main cutting angle; and a processing of the main cut in a second opposite-oriented feed direction. In every main cut of the second method variant, following each other in sequence are the positioning of saw head 14; a pivot motion of saw arm 17 in the main cutting angle; a cutting in a first feed direction; as well as a stopping of saw head 14 in a position, in which the upper exit point coincides with the end point. The third method variant differs from the second method variant in that the last method step of a main cut (stopping) and the first method step of the following main cut (positioning) are combined. Saw head 14 is stopped in a position that is calculated in such a manner that the upper exit point, after the pivot motion of saw arm 17 in the main cutting angle of the following main cut, coincides with the end point.

In the embodiment, the main cuts of the main cutting sequence are performed with a saw arm 17, which is configured alternatingly in a pulling and pushing manner. Processing of the separating cut begins at first end point $E_1$. After starting the controlled cutting, saw head 14 is positioned in a start position $X_{Start}$, in which pivot axis 23 has a distance of $\sqrt{[h_1 \cdot (D_1-h_1)]} - \delta \cdot \sin(-\alpha_1)$ to first end point $E_1$, wherein $h_1 = h(-\alpha_1, D_1) = D_1/2 - \Delta \cdot \cos(-\alpha_1)$ refers to the penetration depth of the utilized saw blade into workpiece 24 for a negative first main cutting angle $-\alpha_1$ with first diameter $D_1$ corresponding to saw blade diameter D. In start position $X_{Start}$, saw arm 17 is pivoted out of the basic position at 0° in negative rotation direction 54 into negative first cutting angle $-\alpha_1$. After the pivot motion into negative first cutting angle $-\alpha_1$, first upper exit point 58 of saw blade 16 coincides with first end point $E_1$.

Saw head 14 is moved with saw arm 17, tilted at negative first main cutting angle $-\alpha_1$, and rotating saw blade 16 in positive feed direction 56 (FIG. 5A). During the feed motion, the position of saw head 14 is measured on a regular basis by displacement sensor 33. The feed direction of saw head 14 is stopped when pivot axis 23 has a distance of $\sqrt{[h_1 \cdot (D_1-h_1)]} + \delta \cdot \sin(-\alpha_1)$ to second end point $E_2$, wherein $h_1 = h(-\alpha_1, D_1) = D_1/2 - \Delta - \delta \cdot \cos(-\alpha_1)$ refers to the penetration depth of the utilized saw blade into workpiece 24 given a negative first main cutting angle $-\alpha_1$ with first diameter $D_1$, which corresponds to saw blade diameter D. In this position, second upper exit point 59, facing second end point $E_2$ of saw blade 16 coincides with second end point $E_2$ and the first main cut is ended.

For the second main cut, saw head 14 is positioned in feed direction 28 in such a manner that pivot axis 23 has a distance to second end point $E_2$ of $\sqrt{[h_2 \cdot (D_2-h_2)]} + \delta \cdot \sin(-\alpha_2)$, wherein $h_2 = h(-\alpha_2, D_2) = D_2/2 - \Delta - \delta \cdot \cos(-\alpha_2)$ refers to the penetration depth of the utilized saw blade into workpiece 24 given a negative second main angle $-\alpha_2$ with second diameter $D_2$, which corresponds to saw blade diameter D. In this position, saw arm 17 is pivoted out of the negative first main cutting angle $-\alpha_1$ into the negative second main cutting angle $-\alpha_2$ (FIG. 5B). For the positioning, the distance is adjusted in such a manner that second upper exit is point 59, facing second end point $E_2$, of saw blade 16 coincides with second end point $E_2$ after the pivot motion of saw arm 17 into negative second main cutting angle $-\alpha_2$.

In an alternative design (third method variant), the feed direction of saw head 14 in positive feed direction 56 is stopped when pivot axis 23 has a distance to the second end point $E_2$ of $\sqrt{[h_2-(D_2-h_2)]} + \delta \cdot \sin(-\alpha_2)$, wherein $h_2 = h(-\alpha_2, D_2) = D_2/2 - \Delta \delta \cdot \cos(-\alpha_2)$ refers to the penetration depth of the utilized saw blade into workpiece 24 given a negative second main cut angle $-\alpha_2$ with second diameter $D_2$, which corresponds to saw blade diameter D. In this position, saw arm 17 is pivoted out of the negative first main cutting angle $-\alpha_1$ into the negative second main cutting angle $-\alpha_2$.

After the pivot motion in the negative second main cutting angle $-\alpha_2$, saw head 14 is moved in negative feed direction 57 to first end point $E_1$, wherein the position of saw head 14 is measured on a regular basis during the feed motion of displacement sensor 33. The feed motion of saw head 14 is stopped when pivot axis has a distance of $\sqrt{[h_2 \cdot (D_2-h_2)]} - \delta \cdot \sin(-\alpha_2)$ to the first end point $E_1$, wherein $h_2 = h(-\alpha_2, D_2) = D_2/2 - \Delta - \delta \cdot \cos(-\alpha_2)$ refers to the penetration depth of the utilized saw blade in workpiece 24 given a negative second main cut angle $-\alpha_2$ with second diameter $D_2$. In this position, first upper exit point 58 of saw blade 16 coincides with first end point $E_1$ and the second main cut is ended (FIG. 5C).

After the second main cut, saw head 14 is positioned in feed direction 28 in such a manner that pivot axis 23 has a distance to first end point $E_1$ of $\sqrt{[h_3 \cdot (D_3-h_3)]} - \delta \sim \sin(-\alpha_3)$, wherein $h_3 = h(-\alpha_3, D_3) = D_3/2 - \Delta - \delta \cdot \cos(-\alpha_3)$ refers to the penetration depth of the utilized saw blade 16 into workpiece 24 given a negative third main cut angle $-\alpha_3$ with third diameter $D_3$, which corresponds to saw blade diameter D (FIG. 5D). In this position, saw arm 17 is pivoted out of the negative second main cutting angle $-\alpha_2$ into the negative third main cutting angle $-\alpha_3$ (FIG. 5E).

The third main cut represents the last main cut of the cutting sequence and prior to processing the last main cut, an overcut processing of the free first end point $E_1$ occurs. Prior to starting the controlled processing of the separating cut, the first overcutting sequence is established for free first end point $E_1$. In the embodiment, the first overcutting sequence comprises a first overcut having a first overcutting angle $-\varphi_{1,1}$ of saw arm 17 and a first diameter $D_{1,1}$ of the utilized saw blade as well as a second overcut with a second overcutting angle $-\varphi_{1,2}$ of saw arm 17 and a second diameter $D_{1,2}$ of the utilized saw blade, wherein the second overcutting angle $-\varphi_{1,2}$ corresponds to negative third main angle $-\alpha_3$.

Regarding the overcutting angle, the first index indicates whether the overcut processing occurs at first or second end point $E_1$, $E_2$, wherein the index "1" stands for first end point $E_1$ and the index "2" stands for second end point $E_2$. The second index indicates the cut and varies from 1 to n, n≥2. Overcut processing of free first end point $E_1$ occurs with saw blade 16 and diameters $D_{1,1}$ and $D_{1,2}$ coincide with saw blade diameter D.

Prior to starting controlled cutting, a first starting position and a first ending position are also established. The first starting position is calculated in such a manner that the pivot motion occurs in all overcutting angles $-\varphi_{1,1}$, $-\varphi_{1,2}$ of the first overcutting sequence prior to first end point $E_1$ and the first end point $E_1$ is not exceeded. In the first end position, pivot axis 23 has a position coordinate of $X(E_1) + \sqrt{[\Delta h \cdot (D_3 - \Delta h)]} - \delta \cdot \sin(-\alpha_3)$, wherein $\Delta h = h_3 - T$ refers to the difference between third penetration depth $h_3$ and end depth T and $h_3 = h(-\alpha_3, D_3) = D_3/2 - \Delta - \delta \cos(-\alpha_3)$ refers to the penetration depth of the saw blade (16) into the workpiece (24) given negative third main cutting angle $(-\alpha_3)$.

After the pivot motion in the negative third main cutting angle $(-\alpha_3)$, saw arm 17 is moved into the first starting position. (FIG. 5F) and in the first starting position pivoted into first overcutting angle $-\varphi_{1,1}$ (FIG. 5G). With saw arm 17 tilted at first overcutting angle $-\varphi_{1,1}$, saw head 14 is moved in negative feed direction 57 until pivot axis 23 has reached the first end position (FIG. 5H). Subsequently, saw head 14 is set back in the first starting position (FIG. 5I), saw arm 17 is pivoted in second overcutting angle $-\varphi_{1,2}$ (FIG. 5J) and saw head 14 with saw arm 17 tilted at $-\varphi_{1,2}$ is moved in negative feed direction 57 until pivot axis 23 has reached the first end position (FIG. 5K).

After the overcut processing of free first end point $E_1$, the third main cut is performed with saw arm 17, tilted at negative third main cutting angle $-\alpha_3$, in positive feed direction 56 (FIG. 5L). The feed motion of saw head 14 is stopped when pivot axis 23 has a distance of $\sqrt{[h_3 \cdot (D_3-h_3]} + \delta \cdot \sin(-\alpha_3)$ to the second end point $E_2$, wherein $h_3 = h(-\alpha_3, D_3) = D_3/2 - \Delta - \delta \cdot \cos(-180°)$ refers to the penetration depth of utilized saw blade 16 into workpiece 24 at a negative third main cutting angle $-\alpha_3$ with third diameter $D_3$, which corresponds to saw blade diameter D.

In the embodiment, the second overcutting sequence comprises a first overcut having a first overcutting angle $\varphi_{2,1}$ of saw arm 17 and a first diameter $D_{2,1}$ of the utilized saw blade as well as a second overcut having a second overcutting angle $\varphi_{2,2}$ of saw arm 17 and a second diameter $D_{2,2}$ of the utilized saw blade, wherein the second overcutting angle $\varphi_{2,2}$ corresponds to positive third main cut angle $\alpha_3$. The overcut processing of free second end point $E_1$ [sic] occurs with saw blade 16 and diameters $D_{2,1}$ and $D_{2,2}$ coincide with saw blade diameter D.

Prior to starting the controlled cutting, a second starting position and a second ending position are also established. The second starting position is calculated in such a manner that the pivot motion occurs in all overcutting angles $\varphi_{21}$, $\varphi_{22}$ of the second overcutting sequence prior to second end point $E_2$ and second end point $E_2$ is not exceeded. In the second end position, pivot axis 23 has a position coordinate of $X(E_2)-\sqrt{[\Delta h \cdot (D_3-\Delta h)]}+\delta \cdot \sin(-\alpha_3)$, wherein $\Delta h=h_3-T$ refers to the difference between third penetration depth $h_3$ and end depth T and $h_3=h(-\alpha_3, D_3)=D_3/2-\Delta-\delta \cos(-\alpha_3)$ refers to the penetration depth of the utilized saw blade 16 in workpiece 24 given negative third main cutting angle $(-\alpha_3)$.

After the end of the third main cut, saw head 14 is moved into the second starting position (FIG. 5M) and saw arm 17 in the second starting position is pivoted into first overcutting angle $\varphi_{21}$ (FIG. 5N). With saw head 17 tilted at first overcutting angle $\varphi_{21}$, saw head 14 is moved in positive feed direction 56 until pivot axis 23 has reached the second end position (FIG. 5O). After the removal in the first overcut, saw head 14 is set back into the second starting position (FIG. 5P), saw arm 17 in second starting position is pivoted into second overcutting angle $\varphi_{22}$ (FIG. 5Q) and saw head 14 with tilted saw arm 17 is moved in positive feed direction 56 into the second end position (FIG. 5R). After the end of the second overcutting sequence, saw head 14 is moved into a park position (FIG. 5S) and saw arm 17 in the park position is pivoted out of second overcutting angle $\varphi_{22}$ into the basic position at 0° (FIG. 5T).

In the embodiment of FIGS. 5A-T, the pivot motions from a negative first main cutting angle $-\alpha_1$ into negative second main cutting angle $-\alpha_2$ and from negative second main cutting angle $-\alpha_2$ into negative third main cutting angle $-\alpha_3$ were performed in one step. Alternatively, the pivot motion into negative second main cutting angle $-\alpha_2$ or into negative third main cutting angle $-\alpha_3$ can occur in multiple steps with intermediate angles. The decision as to how many steps are required depends among other things on the specification of saw blade 16, the material properties of workpiece 24, as well as the power and torque of drive motor 18 for the saw blade. The intermediate angles can be established by the operator or the intermediate angles can be established by control unit 29 of wall saw 12 as a function of various boundary conditions. For the method according to the invention, the main cutting angles of the main cuts and possible intermediate angles represent one input variable, which is used for controlling wall saw 12.

The first overcutting sequence for free first end point $E_1$ and the second overcutting sequence for free second end point $E_2$ each have two overcuts. Alternatively, the overcutting sequences can have more than two overcuts.

The invention claimed is:

1. A method for controlling a wall saw system, wherein the wall saw system comprises a guide track and a wall saw with a saw head, a motorized feed unit that displaces the saw head parallel to a feed direction along the guide track, at least one saw blade that is attached to a saw arm, which is pivotable about a pivot axis of a saw head, and that is driven about a rotation axis, and at least one removable blade guard enclosing the saw blade;

and comprising the steps of:
making a separating cut of an end depth (T) in a workpiece having a workpiece thickness (d) between a first end point (E1) and a second end point (E2), wherein at least one of the first and second end points is defined as a free end point with overcutting;
wherein, prior to starting a processing of the separating cut, controlled by a control unit of the wall saw, a saw blade diameter (D) of at least one saw blade (16), positions of the first and second end points ($E_1$, $E_2$) in the feed direction (28), the end depth (T) of the separating cut (51), and a main cutting sequence of m main cuts, where m≥2, between the first and second end points ($E_1$, $E_2$), are determined;
wherein the m main cuts of the main cutting sequence comprise at least a next-to-last main cut with a next-to-last main cutting angle ($\alpha_{m-1}$) of the saw arm and a next-to-last diameter ($D_{m-1}$) of the utilized saw blade and a last main cut with a last main cutting angle ($\alpha_m$) of the saw arm and a last diameter ($D_m$) of the utilized saw blade;
wherein during the processing controlled by the control unit:
the next-to-last main cut is performed with the saw arm pivoted about the pivot axis and arranged at the next-to-last main cutting angle ($\pm\alpha_{m-1}$) calculated from a basic position of the saw arm; and
the last main cut is performed with the saw arm pivoted about the pivot axis and arranged at the last main cutting angle ($\pm\alpha_m$) calculated from the basic position of the saw arm;
wherein, prior to starting the processing controlled by the control unit and in addition to the main cutting sequence for at least one free end point ($E_1$, $E_2$) with overcutting, an overcutting sequence with overcuts is established, wherein the overcutting sequence comprises at least a first overcut with a first overcutting angle ($\pm\varphi_{1,1}$, $\pm\varphi_{2,1}$) of the saw arm and a first diameter ($D_{1,1}$, $D_{2,1}$) of the saw blade used in the first overcut and a second overcut with a second overcutting angle ($\pm\varphi_{1,2}$, $\pm\varphi_{2,2}$) of the saw arm and a second diameter ($D_{1,1}$, $D_{2,2}$) of the saw blade used in the second overcut, and wherein, during the processing controlled by the control unit, the overcutting sequence is performed before the last main cut or after the last main cut.

2. The method according to claim 1, wherein the overcutting sequence comprises a number of n overcuts, n≥2 having j overcutting angles ($\pm\varphi_{1,j}$, $\pm\varphi_{2,j}$) of the saw arm and j diameters ($D_{1,j}$, $D_{2,j}$) of the used saw blade, j=1 to n.

3. The method according to claim 1, wherein prior to starting the processing controlled by the control unit, a saw arm length ($\delta$) of the saw arm, which is defined as a distance between the pivot axis and the rotation axis, and a distance ($\Delta$) between the pivot axis and a top side of the workpiece are determined.

4. The method according to claim 3, wherein the first end point is defined as a free end point with overcutting and a first end position is calculated for the overcutting sequence by the control unit, wherein the pivot axis in the first end position has a position coordinate of $X(E_1)+\sqrt{[\Delta h \cdot (D_m-\Delta h)]}-\delta \sin(\pm\alpha_m)$, wherein $\Delta h=(h_m-T)$ refers to a difference between a penetration depth ($h_m$) for the last main cutting angle ($\pm\alpha_m$) and the end depth (T) and $h_m = h(\pm\alpha_m, D_m) = D_m/2 - \Delta - \delta\cdot\cos(\pm\alpha_m)$ refer to the penetration depth of the saw blade into the workpiece for the last main cutting angle ($\pm\alpha_m$).

5. The method according to claim 4, wherein in the $j^{th}$ overcut of the overcutting sequence, j=1 to n, the saw head is positioned in a first starting position, the saw arm is pivoted into the first starting position in the $j^{th}$ overcutting angle ($\pm\varphi_{i,j}$), and the saw head, with the saw arm tilted in the $j^{th}$ overcutting angle ($\pm\varphi_{i,j}$), is moved into the first end position.

6. The method according to claim 5, wherein the pivot axis in the first starting position has a position coordinate of $X(E_1) + \sqrt{[h(\pm\varphi_{1,n})\cdot(D_{1,n} - h(\pm\varphi_{1,n}))]} - \delta\cdot\sin(\pm\varphi_{1,n})$ for $0° < \varphi_{1,n} \leq 90°$ and $X(E_1) + \sqrt{[h(\pm\varphi_{1,n})(D_{1,n} - h(\pm\varphi_{1,n}))]} - \delta\cdot\sin(\pm 90°)$ for $90° < \varphi_{1,n} \leq 180°$, wherein $h(\pm\varphi_{1,n}, D_{1,n}) = D_{1,n}/2 - \Delta - \delta\cdot\cos(\pm\varphi_{1,n})$ refers to the penetration depth of the used saw blade into the workpiece for the $n^{th}$ overcutting angle ($\pm\varphi_{1,n}$).

7. The method according to claim 3, wherein the second end point ($E_2$) is defined as a free end point with overcutting and for the overcutting sequence, a second end position is calculated by the control unit, wherein the pivot axis in the second end position has a position coordinate of $X(E_2) - \sqrt{[\Delta h - (D_m - \Delta h)]} + \delta\sin(\pm\alpha_m)$, wherein $\Delta h = (h_m - T)$ refers to a difference between the penetration depth ($h_m$) for the last main cutting angle ($\pm\alpha_m$) and the penetration depth (T) and $h_m = h(\pm\alpha_m, D_m) = D_m/2 - \Delta - \delta\cdot\cos(\pm\alpha_m)$ refers to the penetration depth of the used saw blade into the workpiece for the last main cutting angle ($\pm\alpha_m$).

8. The method according to claim 7, wherein in the $j^{th}$ overcut of the overcutting sequence, j=1 to n, the saw head is positioned in a second starting position, the saw arm is pivoted into a second starting position, the saw arm in the second starting position is pivoted into the $j^{th}$ overcutting angle ($\pm\varphi_{2,j}$), and the saw head, with the saw arm tilted in $j^{th}$ overcutting angle ($\pm\varphi_{2,j}$), is moved into the second end position.

9. The method according to claim 8, wherein the pivot axis in the second starting position has a position coordinate of $X(E_2) - \sqrt{[h(\pm\varphi_{2,n})(D_{2,n} - h(\pm\varphi_{2,n}))]} - \delta\cdot\sin(\pm\varphi_{2,n})$ for $0° < \varphi_{2,n} \leq 90°$ and $X(E_2) - \sqrt{[h(\pm\varphi_{2,n})(D_{2,n} - h(\pm\varphi_{2,n}))]} - \delta\cdot\sin(\pm 90°)$ for $90° < \varphi_{2,n} \leq 180°$, wherein $h(\pm\varphi_{2,n}, D_{2,n}) = D_{2,n}/2 - \Delta - \delta\cdot\cos(\pm\varphi_{2,n})$ refers to the penetration depth of the used saw blade in the workpiece for the $n^{th}$ overcutting angle ($\pm\varphi_{2,n}$).

* * * * *